May 3, 1966 R. L. CARLSON 3,248,860
AIR WASHERS
Filed June 18, 1963
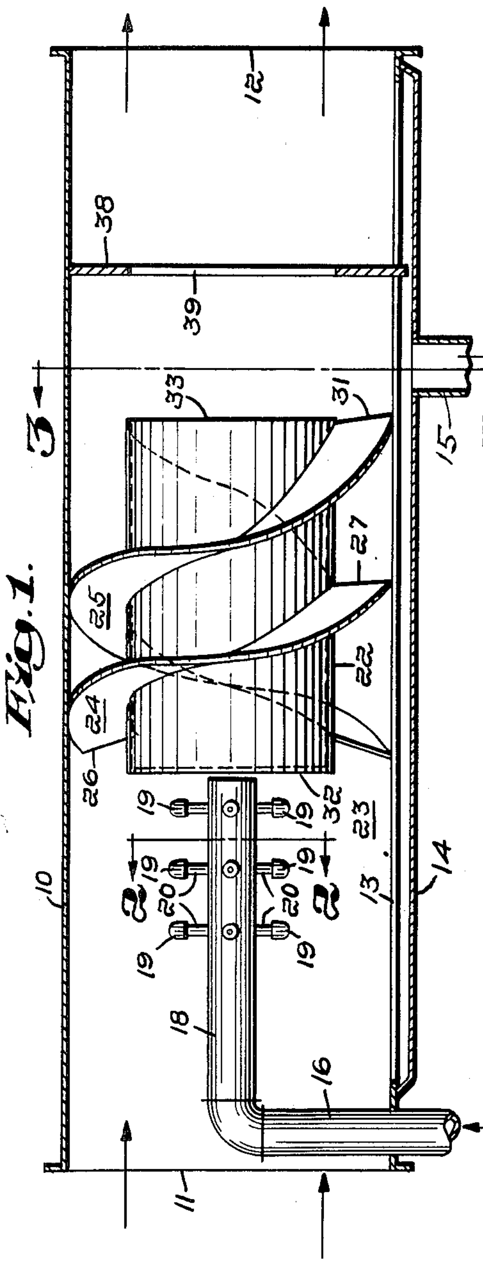
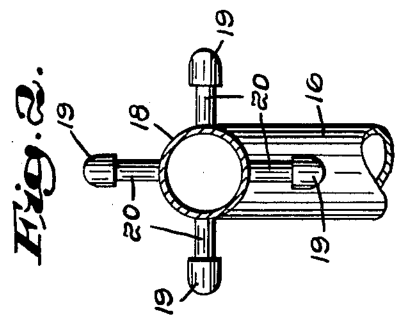
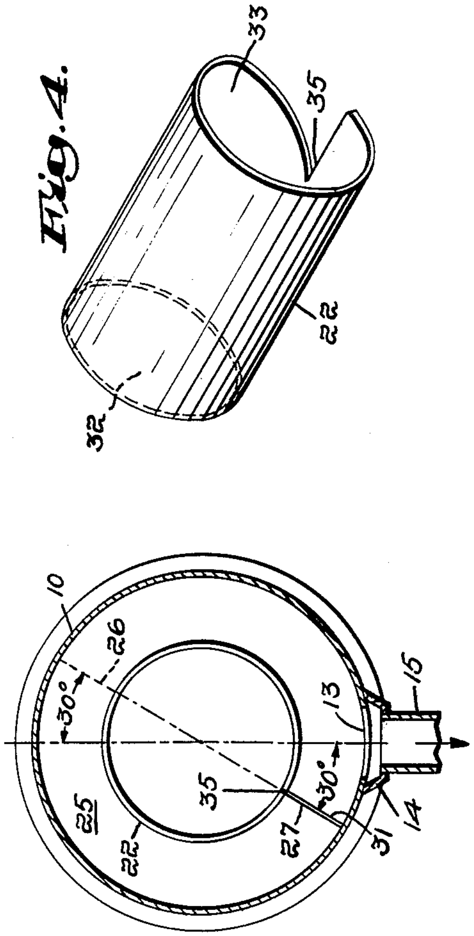
Inventor:
Raymond L. Carlson,
by Robert J. Palmer
Attorney United States Patent Office 3,248,860

Patented May 3, 1966

3,248,860

AIR WASHERS

Raymond L. Carlson, Canton, Mass., assignor to Westinghouse Electric Corporation, East Pittsburgh, Pa., a corporation of Pennsylvania Filed June 18, 1963, Ser. No. 288,647
4 Claims. (Cl. 55—238)

This invention relates to high velocity air washers, and has as an object to remove entrained water particles from the air leaving such washers without using rotating parts.

High velocity air washers, those washing air moving at velocities above 500 f.p.m., are used in air conditioning systems and in industrial air cleaning systems for cleaning and humidifying air. Prior high velocity air washers have used rotary eliminators for removing entrained water particles from the air leaving the washers. Such rotary eliminators have the disadvantages of requiring seals, bearings, and other wearing parts. They are expensive to manufacture, and difficult to maintain. Another, serious disadvantage of such a rotary eliminator is the lint and dust build up unevenly, causing unbalance with resulting vibration and noise.

This invention removes entrained water particles from the air leaving a high velocity air washer by using fixed swirl vanes to cause the air downstream of the spray nozzles to spin so that the entrained water particles are thrown out by centrifugal force, and by using an orifice downstream of the vanes to cause a vortex which removes any entrained water particles that are not removed by the action of the swirl vanes.

This invention will now be described with reference to the annexed drawings, of which:

FIG. 1 is a side section of an air washer embodying this invention:

FIG. 2 is a section along the lines 2—2 of FIG. 1;

FIG. 3 is a section along the lines 3—3 of FIG. 1, and

FIG. 4 is a projected view of the inner cylinder of the air washer.

A cylindrical outer casing 10 has an air inlet 11 and an air outlet 12. The casing has an opening 13 in its bottom with a trough 14 below the opening 13. The trough 14 has a drain pipe 15. A water supply pipe has a vertically extending section 16 extending through the bottom of the casing 10 upstream of the trough 14, and has a section 18 extending horizontally along the axis of the casing part way to the outlet 12. The pipe section 18 is closed at its inner end, and has the usual spray nozzles 19 on the outer ends of radially extending tubes 20, the inner ends of which connect with the interior of the pipe section 18.

Downstream of the inner end of the pipe section 18 is an inner cylinder 22 which has a much smaller diameter than the casing 10. Wrapped spirally around the cylinder 22 within the space between it and the inner surface of the casing 10 are spaced-apart swirl vanes 24 and 25 which support the cylinder from the casing concentric therewith. The vane 24 extends 180° around the cylinder 22, with its air inlet edge 26 and its air outlet edge 27 preferably at about 30° to vertical center lines. The vane 25 extends 360° around the cylinder 22, with its air inlet edge 30 and its air outlet edge 31 preferably at about 30° to vertical center lines.

The upstream end 32 of the cylinder 22 is closed. Its downstream end 33 is open and is cut away to have a straight edge 35 which extends towards the closed end of the cylinder 22 parallel to the axis of the latter, preferably at about 30° to a vertical center line.

Extending across the interior of the casing 10 downstream of the cylinder 22 is a circular sheet 38 which has a central opening 39 having a diameter slightly larger than that of the cylinder 22.

*Operation*

In operation, the air outlet 12 of the casing 10 would be connected to the inlet of an induced draft fan which is not shown, and which would include spin removing vanes. Air would be moved at high velocity through the air inlet 11 of the casing 10, and passed through the spray from the nozzles 19. The washed air would then be caused by the vanes 24 and 25 to spin around the cylinder 22. Centrifugal force would cause the entrained water particles to be thrown out against the inner surface of the casing 10 from which they would drain by gravity into the trough 14. Water would also flow down the vanes 24 and 25, and their angled, lower, air outlet ends 27 and 31 respectively, would facilitate the combined actions of centrifugal force and gravity in passing the water from the vanes into the trough 14. The vane 24 is made to extend 180° so that its outlet end 27 can be aligned with the outlet end 31 of the 360° vane 25, and to make the vane 24 extend through 360° would require the cylinder 22 to be lengthened which is not desired.

A vortex would be generated within the cylinder 22 because of the spinning air passing its open end 33, and the entrained water particles in the air within the vortex would be thrown out by centrifugal force against the inner surface of the cylinder 22, and would be caused by the combined actions of centrifugal force and gravity, to flow off the edge 35 into the trough 14. Thus, further collection would take place in a second stage within the cylinder 22.

The opening 39 in the sheet 38, acting as an orifice, would cause a second vortex to be generated in the spinning air within the space between the sheet 38 and the air outlet 12 of the casing 10, causing any remaining water particles in the air to be thrown out by centrifugal force against the inner surface of the casing between the sheet 38 and the outlet 12, from which they would drain by gravity into the trough 14. Thus, further and final collection would take place in a third stage between the sheet 38 and the air outlet 12.

What is claimed is:

1. An air washer comprising an elongated, horizontally extending, cylindrical casing having an air inlet at one end and an air outlet at the opposite end, spray nozzles within said casing adjacent to said inlet, a cylinder within said casing concentric therewith downstream of said nozzles, a pair of spaced apart swirl vanes wound spirally around said cylinder with their inner edges in contact with the outer surface of said cylinder and their outer edges in contact with the inner surface of said casing, one of said vanes extending substantially 180° around said cylinder, and the other one of said vanes extending substantially 360° around said cylinder, said casing having a bottom portion, said vanes having outlet ends terminating in said bottom portion of said casing to one side of a vertical plane extending through the axis of said cylinder, said cylinder having a bottom portion, having a closed upstream end and an open downstream end, said bottom portion of said cylinder being cut away to have a straight edge extending from said open end towards said closed end substantially parallel to said axis and to the same side of said vertical plane as said outlet ends of said vanes.

2. An air washer as claimed in claim 1 in which said bottom portion of said casing has a longitudinally extending opening in its center, and in which a trough is provided below said longitudinally extending opening.

3. An air washer as claimed in claim 1 in which a circular sheet extends across the interior of said casing downstream of said cylinder with its edge in contact with the inner surface of said casing, and has a central circular opening, the interior of said casing between said downstream end of said cylinder and said sheet being open.

4. An air washer as claimed in claim 3 in which said bottom portion of said casing has a longitudinally extending opening in its center, and in which a trough is provided below said longitudinally extending opening.

References Cited by the Examiner

UNITED STATES PATENTS

| | | | |
|---|---|---|---|
| 922,516 | 5/1909 | Rockliff et al. | 55—456 X |
| 1,104,717 | 7/1914 | Topf | 55—238 |
| 2,473,602 | 6/1949 | Lavigne | 55—457 X |
| 2,473,672 | 6/1949 | Ziliotto | 55—237 X |

FOREIGN PATENTS

| | | |
|---|---|---|
| 1,056,590 | 5/1959 | Germany. |
| 16,822 | 7/1896 | Great Britain. |
| 371,129 | 4/1932 | Great Britain. |
| 920,203 | 3/1963 | Great Britain. |

HARRY B. THORNTON, *Primary Examiner.*

ROBERT F. BURNETT, *Examiner.*

D. K. DENENBERG, L. H. McCARTER, *Assistant Examiners.*